US012387146B2

(12) United States Patent
Yamamoto et al.

(10) Patent No.: US 12,387,146 B2
(45) Date of Patent: Aug. 12, 2025

(54) CONTENT CLASSIFICATION METHOD

(71) Applicant: Semiconductor Energy Laboratory Co., Ltd., Kanagawa-ken (JP)

(72) Inventors: Kunitaka Yamamoto, Kanagawa (JP); Junpei Momo, Kanagawa (JP); Kazuki Higashi, Kanagawa (JP); Takahiro Fukutome, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1101 days.

(21) Appl. No.: 17/292,783

(22) PCT Filed: Nov. 6, 2019

(86) PCT No.: PCT/IB2019/059522
§ 371 (c)(1),
(2) Date: May 11, 2021

(87) PCT Pub. No.: WO2020/099986
PCT Pub. Date: May 22, 2020

(65) Prior Publication Data
US 2021/0398025 A1 Dec. 23, 2021

(30) Foreign Application Priority Data
Nov. 15, 2018 (JP) .................. 2018-214778

(51) Int. Cl.
*G06N 20/20* (2019.01)
(52) U.S. Cl.
CPC .................. *G06N 20/20* (2019.01)
(58) Field of Classification Search
CPC ....... G06F 18/2155; G06F 18/23; G06N 3/08; G06N 3/0895; G06N 20/20
See application file for complete search history.

(56) References Cited

U.S. PATENT DOCUMENTS

| 7,287,012 B2 | 10/2007 | Corston et al. |
| 10,891,765 B2 | 1/2021 | Oobuchi et al. |

(Continued)

FOREIGN PATENT DOCUMENTS

| EP | 3 444 731 A1 | 2/2019 |
| JP | 2009-104630 A | 5/2009 |
| JP | 2017-076287 A | 4/2017 |
| JP | 2018-061771 A | 4/2018 |
| WO | WO 2017/179258 A1 | 10/2017 |
| WO | WO 2018/070285 A1 | 4/2018 |

OTHER PUBLICATIONS

Heimerl, Florian, et al. "Visual classifier training for text document retrieval." IEEE Transactions on Visualization and Computer Graphics 18.12 (2012): 2839-2848. (Year: 2012).*

(Continued)

*Primary Examiner* — Randall K. Baldwin
(74) *Attorney, Agent, or Firm* — Husch Blackwell LLP

(57) ABSTRACT

A novel content classification method is provided. A content classification method using machine learning for a learning model and a classifier fabrication method are provided. In Step 1, a data set containing a plurality of contents is acquired. Learning labels are attached to m contents, and the learning labels are not attached to the remaining contents. In Step 2, a first learning model is created by machine learning using the m contents. In Step 3, judgment labels are attached to the plurality of contents using the first learning model and are displayed on a GUI. In Step 4, new learning labels are attached to k contents in the plurality of contents. In Step 5, a second learning model is created by the machine learning using the k contents. In Step 6, judgment labels are attached to the plurality of contents using the second learning model and are displayed on the GUI.

16 Claims, 9 Drawing Sheets

(56) References Cited

U.S. PATENT DOCUMENTS

| | | | |
|---|---|---|---|
| 11,868,436 B1* | 1/2024 | Gokalp | G06N 20/20 |
| 2008/0086432 A1* | 4/2008 | Schmidtler | G06F 16/353 |
| | | | 706/14 |
| 2017/0109427 A1 | 4/2017 | Izumi et al. | |
| 2019/0005035 A1 | 1/2019 | Yamazaki et al. | |
| 2019/0035122 A1* | 1/2019 | Oobuchi | G06T 11/206 |
| 2019/0244113 A1* | 8/2019 | Ramos | G06F 3/04847 |
| 2020/0409963 A1 | 12/2020 | Higashi et al. | |

OTHER PUBLICATIONS

Iwai, Hidenari, et al. "Sentence-based plot classification for online review comments." 2014 IEEE/WIC/ACM International Joint Conferences on Web Intelligence (WI) and Intelligent Agent Technologies (IAT). vol. 1. IEEE, 2014. (Year: 2014).*

Pan, Xingfeng, Jin Yang, and Xiaofeng Qiu. "A multi-label model to predict undisclosed attributes in microblogging." 2015 International Conference on Behavioral, Economic and Socio-cultural Computing (BESC). IEEE, 2015. (Year: 2015).*

Guidotti, Riccardo, Anna Monreale, and Salvatore Rinzivillo. "Learning Data Mining." 2018 IEEE 5th International Conference on Data Science and Advanced Analytics (DSAA). IEEE, Oct. 2018. (Year: 2018).*

International Search Report (Application No. PCT/IB2019/059522) Dated Jan. 28, 2020.

Written Opinion (Application No. PCT/IB2019/059522) Dated Jan. 28, 2020.

* cited by examiner

FIG. 4

| No | ID | U-Label | A-Label | Score | Contents |
|---|---|---|---|---|---|
| 1 |  | ☐ |  |  |  |
| 2 |  | ☐ | 33a |  |  |
| 3 |  | ☐ | 33b |  |  |
| 4 |  | ☐ | 33c |  |  |
| 5 |  | ☐ | 33d |  |  |
| 6 |  | ☐ | 33e |  |  |
| 7 |  | ☐ | 33f |  |  |
| ⋮ |  |  | 33g |  |  |
| n |  | ☐ |  |  |  |

| No | ID | U-Label | A-Label | Score | Contents |
|---|---|---|---|---|---|
| 1 | xxx1 | Yes | Yes | 0.874 | △■●○×··· |
| 2 | xxx2 | No | No | 0.657 | ×○■■■··· |
| 3 | xxx3 | Yes | Yes | 0.789 | △■○○×··· |
| 4 | xxx4 |  | Yes | 0.747 | △■○○×··· |
| 5 | xxx5 |  | Yes | 0.520 | △■○○●··· |
| 6 | xxx6 |  | No | 0.489 | ■△●○△··· |
| 7 | xxx7 |  | Yes | 0.538 | △■●○△··· |
| ⋮ | ⋮ | ⋮ | ⋮ | ⋮ | ⋮ |
| n | xxxx |  | No | 0.711 | ■○×■■··· |

GroupA = rows 1–3

FIG. 6B

| No | ID | U-Label | A-Label | Score | Contents |
|---|---|---|---|---|---|
| 1 | xxx1 | Yes | Yes | 0.874 | △■●○×··· |
| 2 | xxx2 | No | No | 0.657 | ×○■■■··· |
| 3 | xxx3 | Yes | Yes | 0.789 | △■○○×··· |
| 4 | xxx4 | Yes | Yes | 0.747 | △■○○×··· |
| 5 | xxx5 | Yes | Yes | 0.520 | △■○○●··· |
| 6 | xxx6 | No | No | 0.489 | ■△●○△··· |
| 7 | xxx7 |  | No | 0.625 | △■●○△··· |
| ⋮ | ⋮ | ⋮ | ⋮ | ⋮ | ⋮ |
| n | xxxx |  | No | 0.838 | ■○×■■··· |

GroupA = rows 1–3; GroupB = rows 4–6

FIG. 7

| No | ID | U-Label | A-Label | Score | Contents |
|---|---|---|---|---|---|
| 1 | xxx1 | Yes (33a) | Yes | 0.874 | |
| 2 | xxx2 | No (33b) | No | 0.657 | |
| 3 | xxx3 | Yes (33c) | Yes | 0.789 | |
| 4 | xxx4 | (33d) | No | 0.747 | |
| 5 | xxx5 | (33e) | No | 0.223 | |
| ⋮ | ⋮ | ⋮ | ⋮ | ⋮ | ⋮ |
| n | xxxx | (33n) | No | 0.711 | |

Rows 1–3: GroupA 30, 31, 32, 33, 34, 35, 36

CONTENT CLASSIFICATION METHOD

This application is a 371 of international application PCT/IB2019/059522 filed on Nov. 6, 2019 which is incorporated herein by reference.

TECHNICAL FIELD

One embodiment of the present invention relates to a computer device, a graphical user interface, a content classification method, and a classifier fabrication method.

Note that one embodiment of the present invention relates to a computer device. One embodiment of the present invention relates to a classification method of computerized content (text data, image data, voice data, or moving image data) by utilizing a computer device. In particular, one embodiment of the present invention relates to a computer device that efficiently classifies a collection of content by using machine learning. Note that one embodiment of the present invention relates to a content classification method by a computer device using a graphical user interface controlled by a program and a classifier fabrication method.

BACKGROUND ART

A user would like to easily extract information related to a user-specified topic from a collection of content. In recent years, a novel classification system using a learning model that has learned by machine learning has been proposed. For example, Patent Document 1 has disclosed a machine learning approach to determining a document highly relevant with a user-specified topic.

PRIOR ART DOCUMENT

Patent Document

[Patent Document 1] Japanese Published Patent Application No. 2009-104630

SUMMARY OF THE INVENTION

Problems to be Solved by the Invention

A collection of certain documents (for example, patents or papers) is sometimes classified according to the purpose. The collection of the documents is classified according to a variety of items such as abstracts, keywords, drawings, and memos associated with the documents. The accuracy and efficiency of classification depend on the content of target documents; however, differences are likely to occur depending on the experience and skill of operators. Moreover, it is necessary to rely on human power to classify a large amount of documents, which causes an efficiency problem.

In order to fabricate a classifier using machine learning, a large amount of learning data needs to be prepared; thus, there are problems in that undue stress is sometimes put on a user and a variation in the amount of classified content in learning data influences classifier accuracy.

In view of the above problems, an object of one embodiment of the present invention is to provide a method for efficiently classifying information. Another object of one embodiment of the present invention is to provide a graphical user interface for efficiently classifying information. Another object of one embodiment of the present invention is to provide a program for efficiently classifying information.

Note that the description of these objects does not preclude the existence of other objects. Note that one embodiment of the present invention does not have to achieve all these objects. Note that objects other than these will be apparent from the description of the specification, the drawings, the claims, and the like, and objects other than these can be derived from the description of the specification, the drawings, the claims, and the like.

Note that the objects of one embodiment of the present invention are not limited to the objects listed above. The objects listed above do not preclude the existence of other objects. Note that the other objects are objects that are not described in this section and will be described below. The objects that are not described in this section will be derived from the description of the specification, the drawings, and the like and can be extracted from the description by those skilled in the art. Note that one embodiment of the present invention is to solve at least one of the objects listed above and/or the other objects.

Means for Solving the Problems

A proposed system utilizes machine learning. Machine learning is performed based on a comparatively small amount of training data in a collection of first documents so that a learning model is acquired, and the remaining documents are classified using the acquired learning model. The accuracy of classification results to be obtained depends on the quality of the learning model. On the assumption that sufficient accuracy cannot be obtained by machine learning performed once, classification, verification, and machine learning are repeated on the same graphical interface so that a high-quality learning model can be created.

An operator evaluates whether classification performed by a machine is appropriate or not and adds evaluation data as training data. Machine learning is performed again based on the first training data and the added training data so that a second learning model is acquired. The accuracy of the second learning model is increased by the increase of the training data.

A learning model with sufficient accuracy can be obtained through repetition of these operations. In addition, the present invention is to provide a graphical user interface for efficiently performing the operations of obtaining this learning model.

Note that two kinds of classification or three or more kinds of classification may be performed depending on the purpose of the operator.

Accordingly, the machine can learn the training data that is input to part of the data so that the operator can perform classification, and the operator can classify all the documents in a short time compared to the case where all the documents are judged through manual work or visual inspection. A known technique may be used as a machine learning mechanism. For example, Naive Bayes, random forest, or the like can be used.

In a first step, a file containing text data is prepared. Note that the file containing text data is sometimes rephrased as content. In addition, the content includes not only text data but also image data, voice data, or moving image data. Note that as an example of the content, text contained in a patent document can be used.

In a second step, the file is read and the text data is displayed on a screen.

In a third step, classification of part of all data is input to a learning label as training data. Note that in the second step, the file may be prepared while classification is input in advance to some of the documents as the training data (learning label), and the classification may be imported as the learning label at the time of reading.

In a fourth step, a learning start button is pressed so that the learning model is acquired, and classification is input to a judgment label by utilizing the learning model. At this time, a label corresponding to the classification is attached as the judgment label. The judgment label is a label attached through calculation of the learning model.

In a fifth step, the attached judgment label is evaluated by an operator, and an evaluation result is input to the learning label as additional training data.

In a sixth step, the learning start button is pressed so that the learning model is acquired, and classification is input to the judgment label by utilizing the learning model.

In a seventh step, the fifth step and the sixth step are repeated until sufficient classification accuracy can be obtained.

One embodiment of the present invention is a content classification method and a classifier fabrication method. The content classification method includes a step of acquiring a data set containing a plurality of contents including m contents (m represents a natural number) to which a learning label is attached and n contents (n represents a natural number) to which the learning label is not attached. The content classification method includes a step of creating a first learning model by machine learning using the m contents. The content classification method includes a step of attaching a judgment label to the plurality of contents using the first learning model and displaying the judgment label in a graphical user interface. The content classification method includes a step of further attaching a new learning label to q contents (q represents a natural number) in the n contents. The content classification method includes a step of creating a second learning model by the machine learning using the (q+m) contents to which the learning label is attached. The content classification method includes a step of attaching a new judgment label to the plurality of contents using the second learning model and displaying the new judgment label in the graphical user interface.

One embodiment of the present invention is a content classification method and a classifier fabrication method. The content classification method includes a step of acquiring a data set containing a plurality of contents. In the plurality of contents, a learning label is attached to m contents by a user, and the learning label is not attached to the remaining contents. The content classification method includes a step of creating a first learning model by machine learning using the m contents to which the learning label is attached. The content classification method includes a step of attaching a judgment label to the plurality of contents using the first learning model and displaying the judgment label in a graphical user interface. The content classification method includes a step of attaching a new learning label to k contents in the plurality of contents. The content classification method includes a step of creating a second learning model by the machine learning using the k contents to which the learning label is attached. The content classification method includes a step of attaching a new judgment label to the plurality of contents using the second learning model and displaying the new judgment label in the graphical user interface. Note that k represents a natural number larger than m. In addition, the collection of the k contents may contain all the collection of the m contents or part of the collection of the m contents.

One embodiment of the present invention is a content classification method and a classifier fabrication method. The content classification method includes a step of acquiring a data set containing a plurality of contents. In the plurality of contents, a learning label is attached to m contents, and the label is not attached to the remaining contents. The content classification method includes a step of performing calculation of a first score for estimating a judgment label of the plurality of contents using the m contents to which the learning label is attached. The content classification method includes a step of displaying a list of labels determined based on the first score and attached to the plurality of contents in a graphical user interface. The content classification method includes a next step of attaching a new learning label to k contents in the plurality of contents included in the list. The content classification method includes a step of performing calculation of a second score for estimating a judgment label of the plurality of contents using the k contents to which the learning label is attached. The content classification method includes a step of displaying the list of new judgment labels determined based on the second score and attached to the plurality of contents in the graphical user interface. Note that k represents a natural number larger than m. In addition, the collection of the k contents may contain all the collection of the m contents or part of the collection of the m contents.

In the above structure, the classification method includes a step of specifying a specific numerical range in the first score and attaching a learning label to the corresponding content.

In each of the above structures, in the classification method, the plurality of contents are text data.

In each of the above structures, the classification method further includes a step of performing clustering using unsupervised learning on a data set including the plurality of contents.

In each of the above structures, in the classification method, the plurality of contents include text contained in a patent document.

Effect of the Invention

One embodiment of the present invention can provide a method for efficiently classifying information. Alternatively, one embodiment of the present invention can provide a user interface for efficiently classifying information. Alternatively, one embodiment of the present invention can provide a program for efficiently classifying information.

In addition, one embodiment of the present invention can provide a user with an interactive interface for fabricating a classifier utilizing machine learning, which can reduce burden on the user, such as preparation of training data and evaluation of learning results.

Note that the effects of one embodiment of the present invention are not limited to the effects listed above. The effects listed above do not preclude the existence of other effects. Note that the other effects are effects that are not described in this section and will be described below. The other effects that are not described in this section will be derived from the description of the specification, the drawings, and the like and can be extracted from the description by those skilled in the art. Note that one embodiment of the present invention is to have at least one of the effects listed above and/or the other effects. Accordingly, depending on the case, one embodiment of the present invention does not have the effects listed above in some cases.

BRIEF DESCRIPTION OF THE DRAWINGS

FIG. 4 is a diagram showing a user interface.

FIG. 6A and FIG. 6B are diagrams each showing a user interface.

FIG. 7 is a diagram showing a user interface.

MODE FOR CARRYING OUT THE INVENTION

Embodiment

Figure 1:
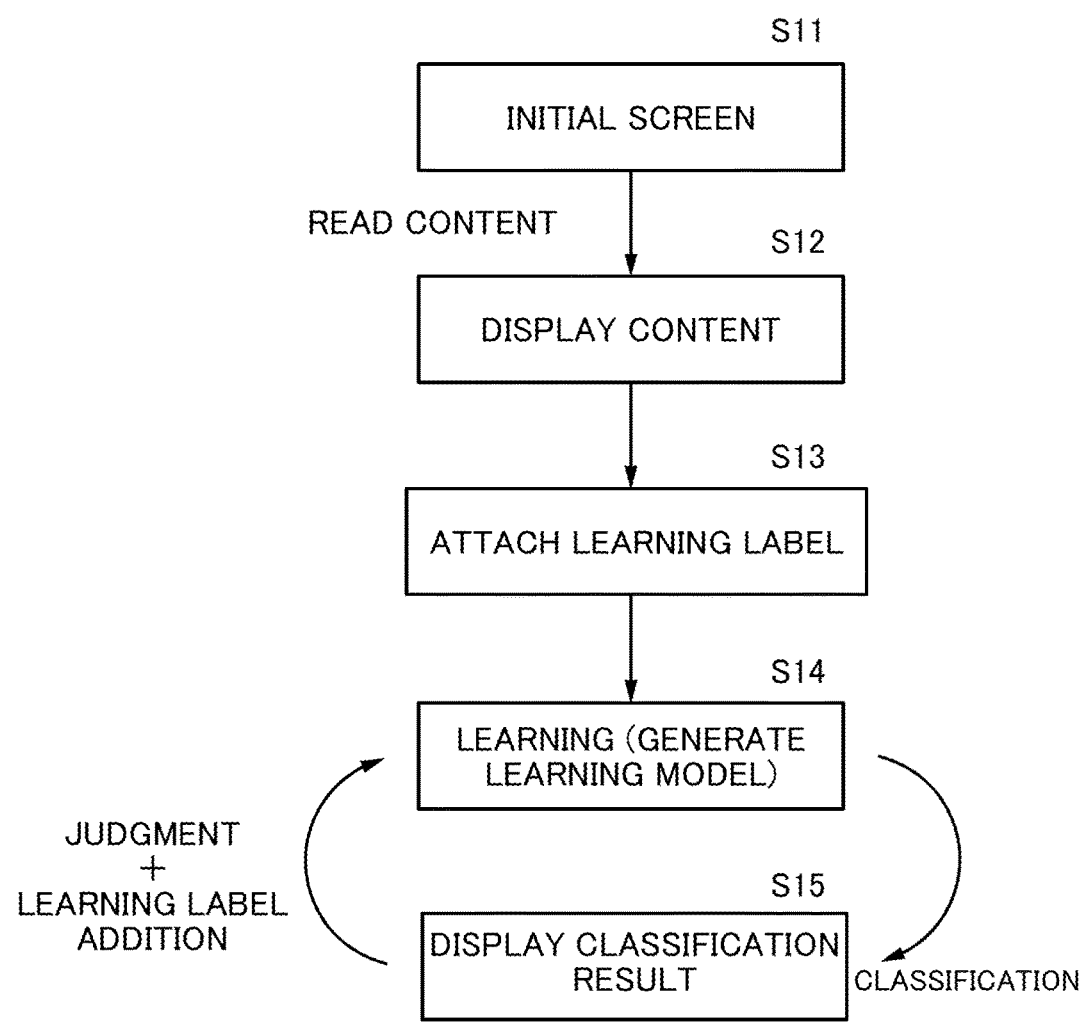
FIG. 1 is a diagram showing a classification method.

In this embodiment, content classification methods will be described using FIG. 1 to FIG. 9.

A content classification method or a classifier fabrication method described in this embodiment is controlled by a program that operates on a computer device. The program is stored in a memory or a storage that is included in the computer device. Alternatively, the program is stored in a computer device that is connected through a network (LAN (Local Area Network), WAN (Wide Area Network), the Internet, or the like) or a server computer device with a database.

Note that a display device included in the computer device is capable of displaying data input to the program by a user and a result of computation of the input data by an arithmetic unit included in the computer device. Note that the structure of the computer device will be described in detail in FIG. 8.

When data to be displayed on a display device connected to the computer device follows a listed display format, the user can easily recognize the data, which increases the ease of operation. As an example, a display format that enables the user to communicate with a program included in the computer device through the display device easily is described as a graphical user interface (hereinafter referred to as GUI).

The user can utilize a content classification method or a classifier fabrication method of the program through the GUI. The GUI facilitates content classification operation performed by the user. In addition, the user can visually judge a content classification result through the GUI easily. Furthermore, with the use of the GUI, the user can operate the program easily. Note that the content refers to text data, image data, voice data, moving image data, or the like.

Next, a content classification method and a classifier fabrication method each using a GUI are described according to GUI operating procedures. First, the user has a step of acquiring a data set of a plurality of contents through the GUI. A plurality of contents refer to files stored in a memory or a storage that is included in a computer device or files stored in a computer connected to a network, a server, or the like.

For example, the plurality of contents are preferably listed and stored in the file. Alternatively, the contents may be stored in separate files.

The case where the contents stored in the file are text data is described as an example. Note that in this specification, the case where the text data are text included in a patent document is described. For example, a plurality of contents are preferably listed and stored in the file. Alternatively, the plurality of contents may be stored in separate files. For example, different kinds or different amounts of text data and the like may be stored in a plurality of files. Each text data can be read from the plurality of files through the GUI.

The program has a step of displaying the read text data on the GUI. The text data preferably has a listed format. The GUI displays the text data in accordance with a display format of the GUI. Note that the listed text data is preferably controlled in the unit called "record." For example, each record is composed of a label ID that is linked to a unique number representing a record sequence, content (text data), and the like.

For example, in the case where the content is text data, it is difficult to treat the text data as data for machine learning by the program. Thus, it is necessary to make target text data have a format that can be treated by the program. There is a method for analyzing and vectorizing text data so that machine learning is performed by a computer device. An example of the vectorization method is a method called Bag of Words (BoW). The BoW makes it possible to vectorize the appearance frequency of a keyword included in text data from the text data. For example, a keyword is a character string that appears repeatedly or a character string modified by a plurality of adjectives or predicates. Vectorized text data can be easily treated by the computer device as input data for machine learning. Note that in order to vectorize the text data, distributed representation typified by Word2Vec may be used. Distributed representation is also referred to as embedded representation.

Note that in the above content classification method or classifier fabrication method, classification by unsupervised machine learning, that is, clustering can be performed on the content. For example, K-means or DBSCAN (density-based spatial clustering of applications with noise) functions as a classifier. In addition, in the case where a clustering target is a document, a topic model may be used.

Next, the user has a step of reading n records from the file stored in the memory or the storage that is included in the computer device into the GUI. The GUI displays the n records in accordance with a display format provided by the GUI. The user has a step of attaching learning labels to m records selected by the user from the n records displayed on the GUI. Note that learning labels are not attached to the remaining records. Here, m and n are natural numbers.

Next, the program has a step of creating a learning model by machine learning using the m pieces of text data to which the learning labels are attached. For the learning model, machine learning algorithm such as a decision tree, Naive Bayes, KNN (k Nearest Neighbor), SVM (Support Vector Machines), perceptron, logistic regression, or a neural network can be used.

Furthermore, there may be a step of switching the learning model depending on the number of learning labels. A decision tree, Naive Bayes, or logistic regression may be used when the number of learning labels is small, and SVM, random forest, or a neural network may be used when the number of learning labels is equal to or larger than a certain number. Note that random forest, which is a kind of decision tree algorithm, is used for the learning model used in this embodiment.

In this embodiment, a supervised learning model is used in which a learning model is updated by a program through machine learning performed more than once. Accordingly, classification accuracy is improved every time the learning model is updated. Consequently, a learning model that is generated by the program through first machine learning is referred to as a first learning model, and a learning model that is generated by the program through second machine learning is referred to as a second learning model. Note that a learning model that is generated by the program through p-th machine learning is referred to as a p-th learning model, where p is a natural number.

Next, the program has a step of classifying the text data using the generated learning model and inputting a classification result or a score to each record. To be exact, first, the program generates the first learning model using the m pieces of text data to which the learning labels are attached. Next, the program classifies n pieces of text data using the first learning model. The program inputs a judgment label and a first score to the n records as classification results. Note that the first score is a result of calculation performed by the program to estimate the judgment label using the first learning model. The possible numerical range of the first score is preferably greater than or equal to 0 and less than or equal to 1.

Note that the first score may be rephrased as probability for the judgment label generated by the first learning model. For example, the case where two kinds of data "Yes" and "No" are input as the learning labels is described. In the case where the judgment label that is attached by the program is "Yes," the program displays the probability that the judgment label is "Yes" as the first score. Note that when the learning label has three kinds of data, the judgment label preferably has three kinds of data. That is, the kind of judgment label is preferably equivalent to the kind of learning label.

Next, the program has a step of displaying the judgment label determined based on the first score and the first score on the GUI. To be exact, the program additionally displays the judgment label classified using the first learning model and the first score on a list of the n records displayed on the GUI. Note that the judgment label and the first score are also input to a record to which the learning label is attached.

Next, the user judges each judgment label and the first score. The user has a step of attaching additional learning labels to k records from a plurality of records to which the learning labels are not attached. Note that k is a natural number greater than m. Note that the k records can include some or all of the m records. In the case where the learning labels are attached to the k records, it is preferable not to update m learning labels. When the m learning labels are not updated, information on the first learning model is succeeded. Note that in the case where any of the learning labels attached to the m records can be judged to be a learning label different from the judgment by the user, a new learning label is preferably attached to the learning label. Note that records to which the learning labels are not attached are preferably displayed to the user in ascending order of the first score labels. For example, in the case of classification into two classes, it is desirable to promote label attachment by the user from a record with the first score of around 0.5 (for example, greater than or equal to 0.5 and less than 0.65). Here, the first score means probability.

Note that as a result of judgment of the judgment label of the first learning model and the first score by the user, a learning label that is attached to a record selected from the m records by the user may be updated. A new learning label may be attached to the first learning model so that the second learning model to be described next may be created.

Next, the program has a step of creating the second learning model by machine learning using the k pieces of text data to which the learning labels are attached. The user judges a first judgment label attached to the first learning model, and the program generates the second learning model using k learning labels further added by the user. The program classifies the n pieces of text data again using the second learning model. The program inputs a judgment label and a second score to the n records as classification results. Note that the second score is a result of calculation performed by the program to estimate a second judgment label using the second learning model.

Next, the program has a step of displaying the second judgment label determined based on the second score and the second score on the GUI. To be exact, the program updates display of the second judgment label classified using the second learning model and the second score on the list of the n records displayed on the GUI. Note that the second judgment label and the second score are also input to a record to which a new learning label is attached.

As described above, the user can attach the learning label to the record displayed on the GUI, and the program can generate and update the learning model using the attached learning label. For example, the learning label is attached to some of a large amount of content (text data, image data, voice data, or moving image data) as teacher information. The program generates the learning model using the learning label. The program displays the judgment label using the learning model on the content to which the learning label is not attached. The user updates the learning model by further attaching a learning label to the judgment label displayed by the program on the GUI.

The user can further attach a learning label to the judgment label displayed by the first learning model through the GUI. That is, the program can update the first learning model generated by machine learning to the second learning model where user judgment conditions are added to the first learning model. Accordingly, the program can provide a classification method that enables the user to classify required content from the large amount of content with few processing steps.

Next, the content classification method is described using drawings. FIG. 1 is a diagram showing a content classification method according to one embodiment. Note that each step shown in FIG. 1 represents the processing detail of the program or the GUI.

In Step S11, the program displays an initial screen of the GUI. Note that the initial screen of the GUI will be described in detail in FIG. 4.

The user performs operation of reading the data set into the program through the GUI. Note that the data set refers to a file stored in a memory, a storage, or the like that is included in a computer device, or a file stored in a computer connected to a network, a server, or the like. A plurality of contents are listed and stored in the file.

In Step S12, the content read from the file by the program is displayed. The GUI displays the content in accordance with the display format of the GUI. Note that the listed content is preferably controlled in the unit called "record." For example, each record is composed of a label ID that is linked to a number, content, and the like.

In Step S13, the user attaches learning labels. For example, the user attaches learning labels to the m records selected by the user from the n records displayed on the GUI. Note that labels are not attached to the remaining records. Note that m or n is a natural number.

Step S14, the program creates the first learning model by performing machine learning using the m contents to which the learning labels are attached. There is a step of classifying content using the first learning model generated by the program and inputting a classification result to each record. Note that for the first learning model, machine learning algorithm such as a decision tree, Naive Bayes, KNN, SVM, perceptron, logistic regression, or a neural network can be used.

To be exact, after the program generates the first learning model, the program classifies n contents using the first learning model. The program inputs the judgment label and the first score to the n records as classification results. Note that the first score is a result of calculation performed by the program to estimate the judgment label using the first learning model.

In Step S15, the program displays results of classification using the first learning model on the GUI. The results of classification using the first learning model are input as the judgment label determined based on the first score and the first score. To be exact, the program additionally displays the judgment label classified using the first learning model and the first score on the list of the n records displayed on the GUI. Note that the judgment label and the first score are also input to a record to which the learning label is attached.

Next, the user judges the displayed judgment label. It is not necessary to judge all the judgment labels, and judgment may be made by selecting a given record from the records to which the learning labels are not attached. A result of judgment made here may be used as a learning label in the next step. The user has a step of attaching additional learning labels to k records from a plurality of records to which the learning labels are not attached. Note that k is a natural number greater than m. Note that the k records may include the m records. In the case where the learning labels are attached to the k records, it is preferable not to update the m learning labels. When the m learning labels are not updated, information on the first learning model is succeeded. Note that in the case where any of the learning labels attached to the m records can be judged to be a learning label different from the judgment by the user, a new learning label is preferably attached to the learning label.

The process returns to Step S14. The program has a step of creating the second learning model by machine learning using the k contents to which the learning labels are attached. The user judges a judgment label attached to the first learning model, and the program generates the second learning model using the k learning labels further added by the user. The program classifies the n contents again using the second learning model. The program inputs a judgment label and the second score to the n records as classification results. Note that the second score is a result of calculation performed by the program to estimate a judgment label using the second learning model.

In Step S15, the program displays results of classification using the second learning model on the GUI. The results of classification using the second learning model are input as the judgment label determined based on the second score and the second score. To be exact, the program updates display of the judgment label classified using the second learning model and the second score on the list of the n records displayed on the GUI. Note that the judgment label and the second score are also input to a record to which the learning label is attached.

Owing to repetition of Step S14 and Step S15, classification accuracy is improved every time the learning model is updated. Consequently, a learning model that is generated by the program through first machine learning is referred to as the first learning model, and a learning model that is generated by the program through second machine learning is referred to as the second learning model. Note that a learning model that is generated by the program through p-th machine learning is referred to as the p-th learning model.

Figure 2:
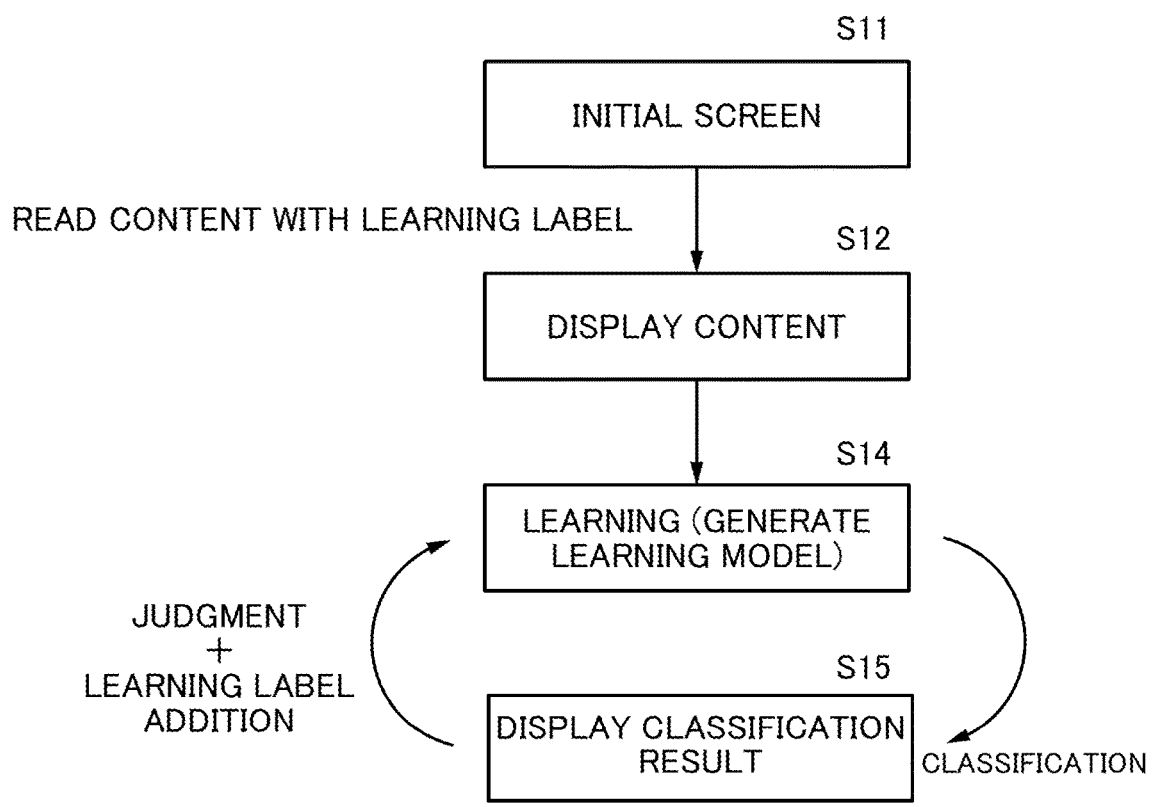
FIG. 2 is a diagram showing a classification method.

Next, a content classification method that is different from the method in FIG. 1 is described in FIG. 2. FIG. 2 differs from FIG. 1 in that content with a learning label is read. Thus, learning label attachment in Step S13 is not needed in FIG. 2. The description of FIG. 1 can be referred to for the other steps because these steps perform the same processing as that in FIG. 1.

Figure 3:
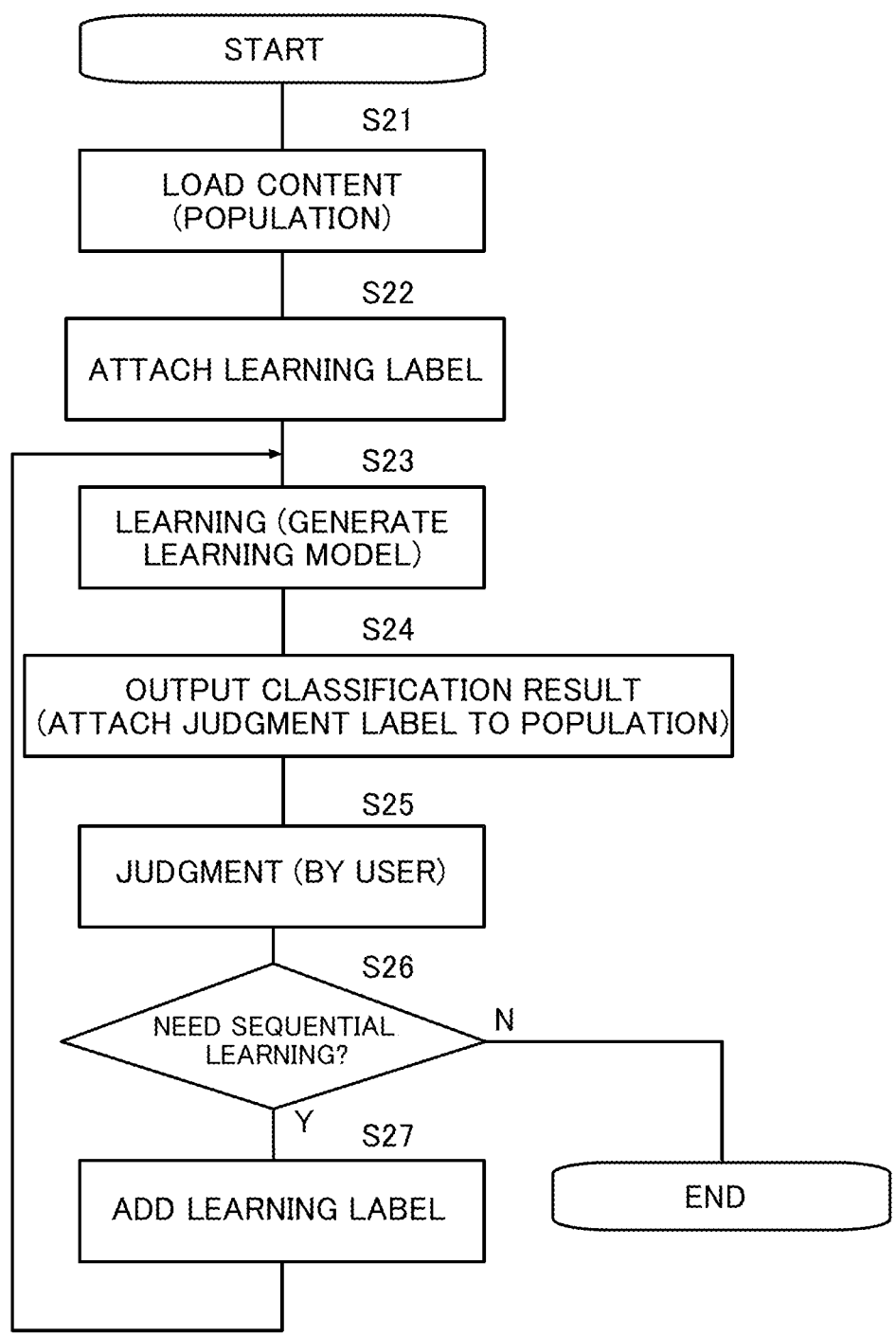
FIG. 3 is a flow chart showing a classification method.

FIG. 3 is a flow chart showing details of the description of FIG. 1. Note that each step shown in FIG. 3 represents the processing detail of the user, the program, or the GUI included in the program. In addition, in the case where description overlaps with the description of FIG. 1, detailed description is sometimes omitted.

Step S21 is a step of loading content. The user performs operation of reading the data set that is a collection of content through the GUI into the program. The program displays the read data set in accordance with the display format of the GUI. The content loaded in Step S21 corresponds to a population for classification.

In Step S22, the user attaches learning labels. For example, the user attaches learning labels to the m records selected by the user from the n records (population) displayed on the GUI. Note that learning labels are not attached to the remaining records. Note that m or n is a natural number.

In Step S23, the program creates the first learning model by machine learning using the m contents to which the learning labels are attached.

In Step S24, the content is classified using the first learning model generated by the program, and classification results are input to each record by the program. The program displays results of classification using the first learning model on the GUI. The results of classification using the first learning model are input as the judgment label determined based on the first score and the first score.

In Step S25, the user may evaluate the classification results of each record displayed on the GUI to judge whether the classification results are reasonable or not.

In Step S26, the user judges whether sequential learning is needed based on the results of classification using the first learning model. In the case where the user judges that sequential learning is needed, the process goes to Step S27. Note that in the case where the user judges that sequential learning is not needed, the content classification is terminated.

In Step S27, the user additionally attaches learning labels. For example, the user attaches new learning labels to the k records by additionally attaching learning labels to records to which the learning labels are not attached except for the m records from the n records (population) displayed on the GUI. Note that labels are not attached to the remaining records. Note that k is a natural number.

In Step S23, the program creates the second learning model by machine learning using the k contents to which the learning labels are attached.

In Step S24, the content is classified using the second learning model generated by the program, and classification results are input to each record by the program. The program displays results of classification using the second learning model on the GUI. The results of classification using the second learning model are input as the judgment label determined based on the second score and the second score.

In Step S25, the user judges the classification results of each record displayed on the GUI.

In Step S26, the user judges whether sequential learning is needed based on the results of classification using the second learning model. In the case where the user judges that sequential learning is needed, the process goes to Step S27. Note that in the case where the user judges that sequential learning is not needed, the content classification is terminated.

The flow chart in FIG. 3 shows an example in which the user judges classification results. Note that some of judgment criteria for the classification results may be input to the program. The program provided with the judgment criteria by the user is capable of repeating learning until the classification results converge.

For example, in the case where a learning model inputs a judgment label and a score to a certain record, when the score is higher than the judgment criteria, a learning label "Yes" can be attached automatically. In addition, as a different example, when the score is lower than the judgment criteria, a learning label "No" can be attached automatically. In the case where the content classification probability of the learning model is high or low, a relearning label can be attached automatically by the learning model. Accordingly, part of learning of the learning model can be automated, which is suitable for classification of a large amount of content.

Note that it is desirable to promote attachment of labels by the user from records each with a score of around 0.5 (for example, greater than or equal to 0.5 and less than 0.65) in records to which learning labels are not attached. Note that the score can be rephrased as probability.

FIG. 4 is a diagram showing a GUI 30 included in the above program. The GUI includes a plurality of columns and a plurality of records. A record number No is displayed on a column 31. A label ID that is linked to the record number No is displayed on a column 32. A learning label "U-Label" that is linked to the record number No is displayed on a column 33. A judgment label "A-Label" that is linked to the record number No is displayed on a column 34. A score "Score" that is linked to the record number No is displayed on a column 35. Contents "Contents" that are linked to the record number No are displayed on 36. Note that the user can attach learning labels to a column 33$a$ to a column 33$n$ as training data. Note that the learning label "U-Label" is preferably attached to a record to be subjected to learning.

Figure 5:
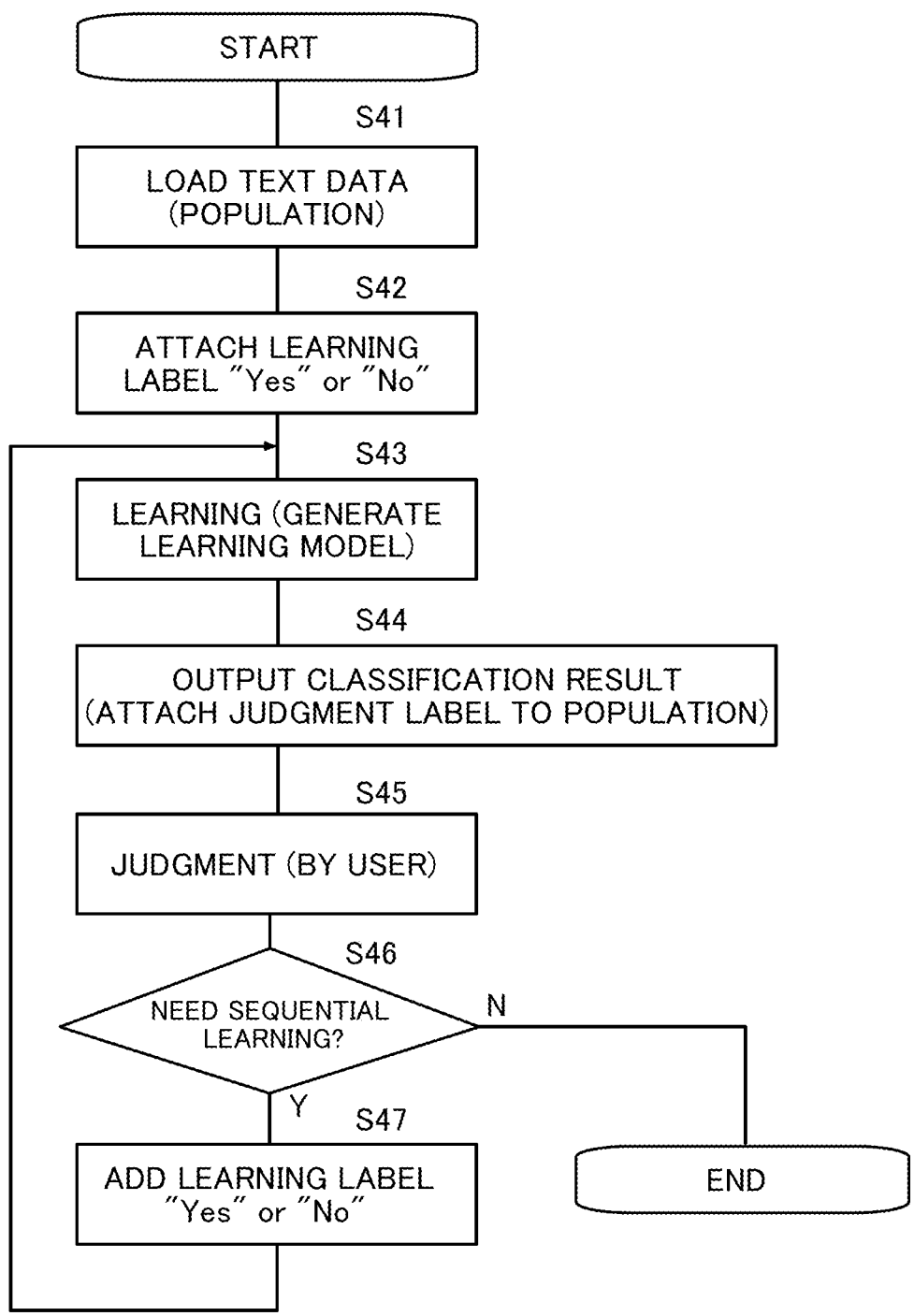
FIG. 5 is a flow chart showing a classification method.

FIG. 5 is a flow chart that is different from FIG. 3. Note that in the case where description overlaps with the description of FIG. 3, detailed description is sometimes omitted.

In Step S41, text data is loaded. The user performs operation of reading a data set that is a collection of text data through the GUI into the program. The program displays read text in accordance with the display format of the GUI. The text data loaded in Step S41 corresponds to a population for classification.

In Step S42, the user attaches learning labels. For example, the user attaches either the learning labels "Yes" or "No" to the m records selected by the user from the n records (population) displayed on the GUI. Note that learning labels are not attached to the remaining records. Note that m or n is a natural number.

In Step S43, the program creates the first learning model by machine learning using the m contents to which the learning labels are attached.

In Step S44, text data is classified using the first learning model generated by the program, and classification results are input to each record by the program. The program displays results of classification using the first learning model on the GUI. The results of classification using the first learning model are input as the judgment label determined based on the first score and the first score. Note that as the first score, a value of greater than or equal to 0 and less than or equal to 1 is input ton records. In addition, either judgment labels "Yes" or "No" are attached to the n records.

In Step S45, the user judges the classification results of each record displayed on the GUI.

In Step S46, the user judges whether sequential learning is needed based on the results of classification using the first learning model. In the case where the user judges that sequential learning is needed, the process goes to Step S47. Note that in the case where the user judges that sequential learning is not needed, the content classification is terminated.

In Step S47, the user additionally attaches learning labels. For example, the user attaches new learning labels to the k records by additionally attaching learning labels to records to which the learning labels are not attached except for the m records from the n records (population) displayed on the GUI. Note that k is a natural number.

In Step S43, the program creates the second learning model by machine learning using the k contents to which the learning labels are attached.

In Step S44, the content is classified using the second learning model generated by the program, and classification results are input to each record by the program. The program displays results of classification using the second learning model on the GUI. The results of classification using the second learning model are input as the judgment label determined based on the second score and the second score.

In Step S45, the user judges the classification results of each record displayed on the GUI.

In Step S46, the user judges whether sequential learning is needed based on the results of classification using the second learning model. In the case where the user judges that sequential learning is needed, the process goes to Step S47. Note that in the case where the user judges that sequential learning is not needed, the content classification is terminated.

The flow chart in FIG. 5 shows an example in which the user judges classification results. Note that judgment criteria for the classification results may be input to the program. The program provided with the judgment criteria is capable of repeating learning until the classification results converge.

For example, in the case where a learning model inputs a judgment label and a score to a certain record, when the score is higher than the judgment criteria, the learning label "Yes" can be attached automatically. In addition, as a different example, when the score is lower than the judgment criteria, the learning label "No" can be attached automatically. In the case where the content classification probability of the learning model is high or low, a relearning label can be attached automatically by the learning model. Accordingly, part of learning of the learning model can be automated, which is suitable for classification of a large amount of text data.

Note that it is desirable to promote attachment of labels by the user from records each with a score of around 0.5 (for example, greater than or equal to 0.5 and less than 0.65) in records to which learning labels are not attached.

FIG. 6A and FIG. 6B are diagrams each showing the GUI 30. FIG. 6A corresponds to Step S44 in the flow chart in FIG. 5. In Step S44, the results of classification using the first learning model are displayed on the GUI 30. An example in which n records are loaded as content is shown. Each record has the number No, the label ID, and text data. In FIG. 6A, text data is displayed on the column 36. Note that for simplicity of description, the text data is replaced with symbols.

An example is shown in which the learning labels ("Yes" or "No") are attached to a record 1 to a record 3 as "Group A" in the column 33a to the column 33c so that the program generates the first learning model. Note that classification of two values is performed in this example; however, classification of three or more values may be performed.

FIG. 6A shows an example in which the first learning model is generated by the program and classification results are input to each record. The classification results display the judgment label ("Yes" or "No") determined based on the first score and the first score. Note that as the first score, a value of greater than or equal to 0 and less than or equal to 1 is input to n records.

For example, the case where the record number No is 1 is described. "Yes" is displayed as the judgment label "A-Label," and "0.874" is displayed as the score "Score." The user attaches the learning label "U-Label" based on the results of classification using the learning model. The score "Score" when "Yes" is displayed as the judgment label "A-Label" shows probability of "Yes", and the score "Score" when "No" is displayed as the judgment label "A-Label" shows probability of "No."

As an example, in the case where the user judges that the results displayed as the judgment label "A-Label" and the score "Score" are correct, "Yes" is input to the learning label "U-Label." As a different example, in the case where the user judges that the results displayed as the judgment label "A-Label" and the score "Score" are incorrect, "No" is input to the learning label "U-Label." When the user inputs a judgment condition to a record whose score "Score" of the result of classification using the learning model is around 0.5 (for example, greater than or equal to 0.5 and less than 0.65), classifier accuracy can be improved.

FIG. 6B shows an example in which the learning labels ("Yes" or "No") are attached to a record 4 to a record 6 as "Group B" in the column 33d to the column 33f so that the program generates the second learning model.

An example is shown in which the second learning model is generated by the program and classification results are input to each record. The classification results display the judgment label ("Yes" or "No") determined based on the second score and the second score. In the first learning model shown in FIG. 6A, the judgment label of a record 7 is "Yes" and the first score of the record 7 is "0.538." In the second learning model shown in FIG. 6B, the judgment label of the record 7 is changed to "No" and the second score of the record 7 is "0.625." As shown in FIG. 6, addition of learning labels to the first learning model can improve the classification probability of records to which learning labels are not attached. Note that the judgment label and the score that are the classification results are just shown as examples; thus, the details of the judgment label and the score are not limited. The judgment label and the score change depending on content to be loaded and a learning label to be attached.

FIG. 7 is a diagram showing the GUI 30. A difference between FIG. 7 and FIG. 6A is described. FIG. 7 shows an example in which n records are loaded as contents. Each record has the number No, the label ID, and image data. In other words, FIG. 7 shows an example in which image data are classified as contents in the column 36. Thus, in one aspect of this embodiment, a classification method for classifying image data can be provided. Note that voice data, moving image data, and the like can be handled as different contents.

Figure 8:
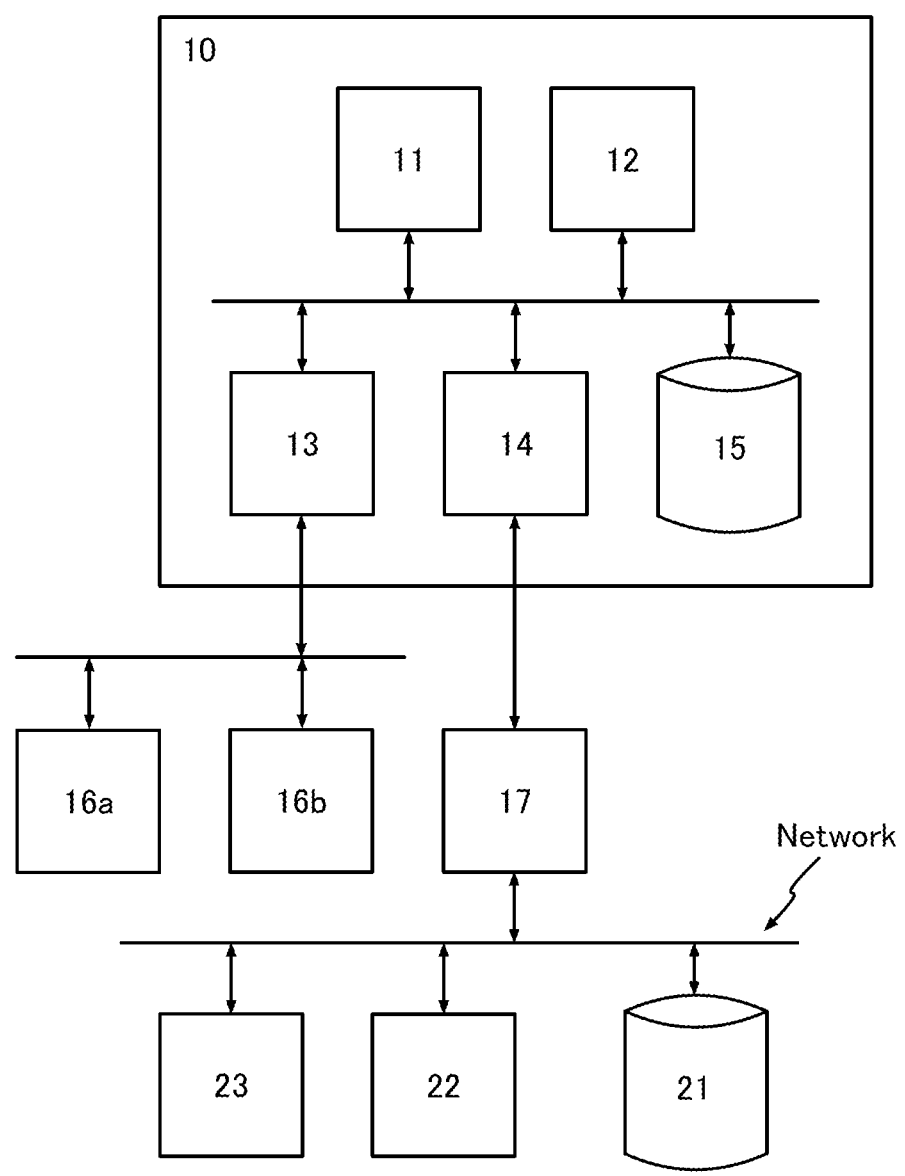
FIG. 8 is a block diagram showing a computer device for operating a program.

FIG. 8 is a diagram showing an electronic device 10 and a database 21, a remote computer 22, and a remote computer 23 to which the electronic device 10 is connected through a network. The electronic device 10 includes an arithmetic unit 11, a memory 12, an input/output interface 13, a communication device 14, and a storage 15. The electronic device 10 is electrically connected to a display device 16a and a keyboard 16b through the input/output interface 13. In addition, the electronic device 10 is electrically connected to a network interface 17 through the communication device 14, and the network interface 17 is electrically connected to the database 21, the remote computer 22, and the remote computer 23 through the network (Network). Note that LAN, WAN, or the Internet can be utilized as the network.

A computer device that is one aspect of this embodiment corresponds to an electronic device. A program of the computer device is stored in the memory 12 or the storage 15. The program generates a learning model using the arithmetic unit 11. The program can perform display on the display device through the input/output interface 13. Input data such as a learning label can be input by the user from the keyboard to the program and the GUI displayed on the display device.

Note that the program can also be utilized in the remote computer 22 or the remote computer 23 through the network. Alternatively, the electronic device 10 can be operated with a program stored in a memory or a storage of the database 21, the remote computer 22, or the remote computer 23. The remote computer 22 may be a portable information terminal or a portable terminal such as a tablet computer or a laptop computer. In the case of a portable information terminal, a portable terminal, or the like, communication can be performed using wireless communication.

Figure 9:
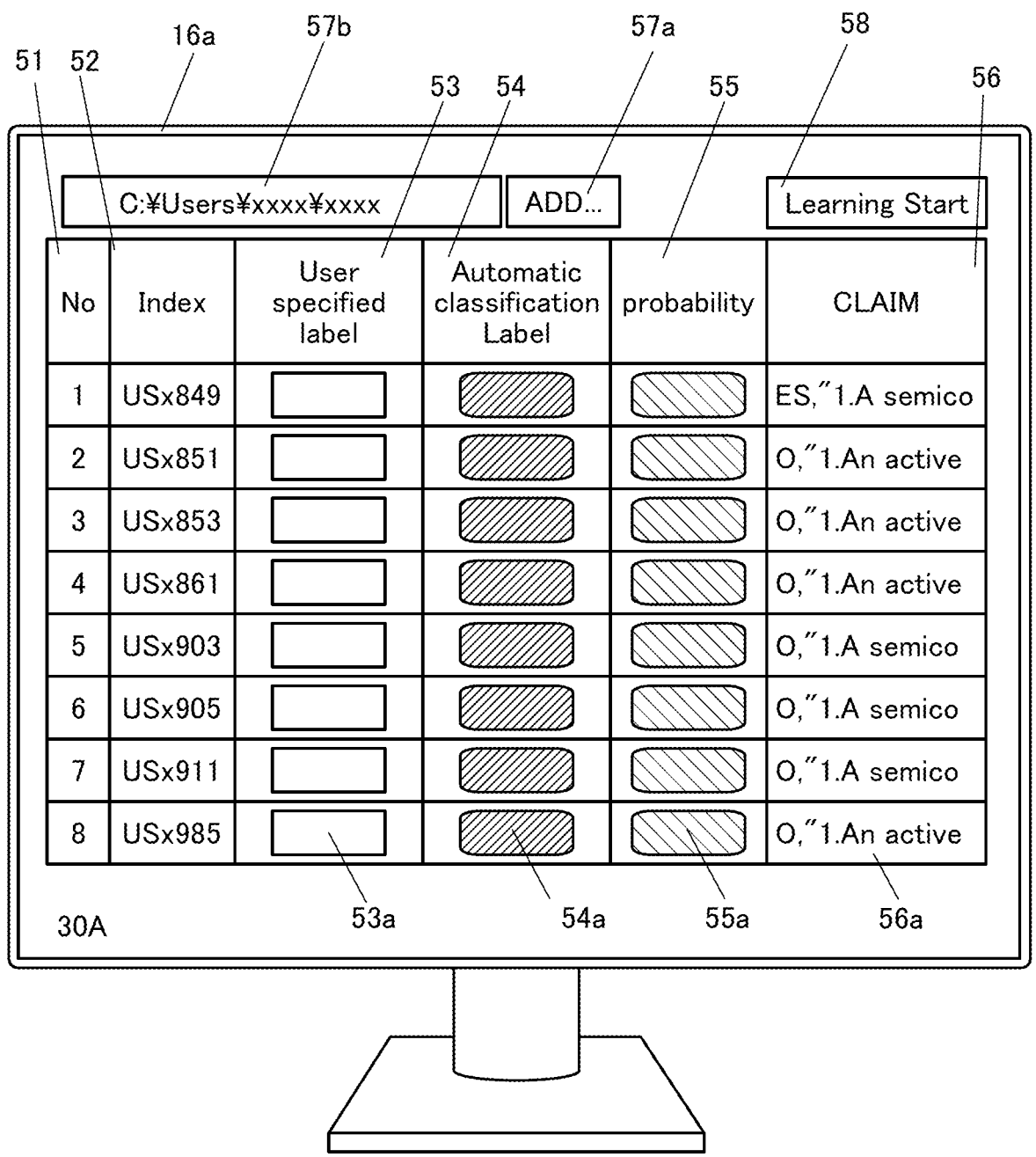
FIG. 9 is a diagram showing a user interface.

FIG. 9 is an example in which a GUI 30A for content classification is displayed on the display device 16a connected to the electronic device 10 shown in FIG. 8.

The GUI 30A includes a plurality of columns and a plurality of records. The records are composed of a column 51 to a column 56 and the like. Furthermore, the GUI 30A includes a button 57a, a button 58, and a display region 57b.

The record number No is displayed on the column 51. Index that is linked to the record number No is displayed on the column 52. A user-specified label "User Specified Label" that is linked to the record number No is displayed on the column 53. An automatic classification label "Automatic classification Label" that is linked to the record number No is displayed on the column 54. Classification probability "probability" that is linked to the record number No is displayed on the column 55. A claim "CLAIM" that is linked to the record number No is displayed on the column 56. The user-specified label corresponds to a learning label, the automatic classification label corresponds to a judgment label, and the probability corresponds to a score.

For example, when the button 57a is pressed, a file that is stored in the memory 12 or the storage 15 in the electronic device 10 can be selected. The storage location of the selected file is displayed on the display region 57b. In the case where the file is selected, information stored in the file is displayed on the GUI 30A. In FIG. 9, information on records stored in the file is displayed on the column 51, the column 52, and the column 56. Note that in FIG. 9, information on a patent is stored as content. A patent number is displayed on the column 52, and claim information that is text data is displayed on the column 56.

Next, the user can attach a user-specified label as training data to a column 53a including a plurality of records. Note that the user-specified label is preferably attached to a record to be learned by the learning model.

Next, when the button 58 is pressed, the program updates the learning model using conditions provided for the GUI 30A. Note that the learning model can be stored in the memory 12 or the storage 15 under a new file name. Thus, the learning model stored in the memory 12 or the storage 15 can be utilized for new data learning, and the learning model can be updated. Alternatively, content classification can be performed using the learning model stored in the memory 12 or the storage 15.

The program classifies the content displayed on the GUI 30A using the updated learning model. As an example, the program inputs an automatic classification label and probability that are classification results to each record. For example, the automatic classification label is displayed on a column 54a included in each record. The classification probability can be displayed on a column 55a included in each record. The detailed text data of the claim can be displayed on a column 56a included in each record.

When the user sees the automatic classification label and the probability that are the classification results input to the record and sufficient classification accuracy is obtained, the learning model update is terminated. When the user sees the automatic classification label and the probability that are the classification results input to the record and judges that classification accuracy is insufficient, the user-specified label can be attached to a record to which a user-specified label is not attached, and the learning model can be updated by pressing the button 58.

Although not illustrated, the display order can be changed in accordance with a numerical value or label information that is included in each column, or a non-display function may be provided by a filter function. Accordingly, the user can evaluate the classification accuracy efficiently. For example, records in the range where scores (probabilities) are at certain levels or lower are only displayed, the learning labels of the records may be changed or new learning labels may be added to the records.

The content classification methods described using FIG. 1 to FIG. 9 can provide methods for classifying high-probability information. For example, the GUIs are suitable for classification of high-probability information. The programs can update the learning models when new training data (learning labels) are input to the learning models. The programs can classify high-probability information when the learning models are updated.

In addition, results of clustering with unsupervised learning performed on all the records before first attachment of the learning labels or second or later attachment of the learning labels may be displayed on the GUIs, and the user may adjust the records to which the learning labels are attached depending on clustering after seeing the clustering results. As such a clustering method, a known method such as k-means clustering or DBSCAN may be used.

Furthermore, the created learning model can be stored in a main body of an electronic device or an external memory. The learning model may be invoked and used for classification of new data sets, and the learning model may be updated according to the above method while new training data is added.

The structures and methods described in this embodiment can be used by being combined as appropriate with structures and methods other than those in this embodiment.

REFERENCE NUMERALS

10: electronic device, 11: arithmetic unit, 12: memory, 13: input/output interface, 14: communication device, 15: storage, 16a: display device, 16b: keyboard, 17: network interface, 21: database, 22, 23: remote computer, and 30, 30A: GUI.

This application is based on Japanese Patent Application Serial No. 2018-214778 filed on Nov. 15, 2018, the entire contents of which are hereby incorporated herein by reference.

The invention claimed is:

1. A content classification method of a computer device, comprising the steps of:
    acquiring a data set comprising a plurality of contents including m contents to which a learning label is attached and n contents to which the learning label is not attached;
    creating a first learning model by machine learning using the m contents;
    attaching a judgment label to the plurality of contents using the first learning model and displaying the judgment label in a graphical user interface;
    attaching a learning label to q contents in the n contents;
    creating a second learning model by the machine learning using the (q+m) contents to which the learning label is attached;
    attaching a judgment label to the plurality of contents using the second learning model and displaying the judgment label in the graphical user interface;
    calculating a first score for estimating the judgment label;
    promoting label attachment when the first score of a record is greater than or equal to 0.5 and less than 0.65; and
    changing, based at least in part on the first score, a display order of the judgement label in the graphical user interface,
    wherein m, n, and q each represent a natural number.

2. The content classification method according to claim 1, wherein the plurality of contents include text.

3. The content classification method according to claim 1, further comprising a step of clustering using unsupervised learning on the data set including the plurality of contents.

4. The content classification method according to claim 1, wherein the plurality of contents include text in a patent document.

5. The content classification method according to claim 1, wherein the judgment label and the learning label are two classes.

6. A content classification method of a computer device, comprising the steps of:
    acquiring a data set comprising a plurality of contents including m contents to which a learning label is attached and n contents to which the learning label is not attached;
    creating a first learning model by machine learning using the m contents;
    attaching a judgment label to the plurality of contents using the first learning model and displaying the judgment label in a graphical user interface;
    attaching a learning label to k contents in the plurality of contents;
    creating a second learning model by the machine learning using the k contents to which the learning label is attached;
    attaching a judgment label to the plurality of contents using the second learning model and displaying the judgment label in the graphical user interface;
    calculating a first score for estimating the judgment label;

promoting label attachment when the first score of a record is greater than or equal to 0.5 and less than 0.65; and changing, based at least in part on the first score, a display order of the judgement label in the graphical user interface, wherein m and k each represent a natural number.

7. The content classification method according to claim 6, wherein the plurality of contents include text.

8. The content classification method according to claim 6, further comprising a step of clustering using unsupervised learning on the data set including the plurality of contents.

9. The content classification method according to claim 6, wherein the plurality of contents include text in a patent document.

10. The content classification method according to claim 6, wherein the judgment label and the learning label are two classes.

11. A content classification method of a computer device, comprising the steps of:

acquiring a data set comprising a plurality of contents including m contents to which a learning label is attached and n contents to which the learning label is not attached;

calculating a first score for estimating a judgment label of the plurality of contents using the m contents;

displaying a list of labels determined based on the first score and attached to the plurality of contents in a graphical user interface;

attaching a learning label to k contents in the plurality of contents included in the list;

creating a learning model by machine learning using the k contents to which the learning label is attached;

calculating a second score for estimating the judgment label of the plurality of contents;

displaying the list of the judgment labels determined based on the second score and attached to the plurality of contents in the graphical user interface;

promoting label attachment when the first score of a record is greater than or equal to 0.5 and less than 0.65; and changing, based at least in part on the first score, a display order of the judgement labels in the graphical user interface, wherein m and k each represent a natural number.

12. The content classification method according to claim 11, further comprising a step of specifying a specific numerical range in the first score and attaching a learning label to the corresponding content.

13. The content classification method according to claim 11, wherein the plurality of contents include text.

14. The content classification method according to claim 11, further comprising a step of clustering using unsupervised learning on the data set including the plurality of contents.

15. The content classification method according to claim 11, wherein the plurality of contents include text in a patent document.

16. The content classification method according to claim 11, wherein the judgment label and the learning label are two classes.

* * * * *